(12) United States Patent
Riepe

(10) Patent No.: US 8,183,193 B2
(45) Date of Patent: May 22, 2012

(54) LIQUID RELEASE AGENT

(75) Inventor: Bernd Riepe, Bünde (DE)

(73) Assignees: Angelika Riepe, Bünde (DE); Hans Riepe, Bünde (DE)

( * ) Notice: Subject to any disclaimer, the term of this patent is extended or adjusted under 35 U.S.C. 154(b) by 776 days.

(21) Appl. No.: 12/201,088

(22) Filed: Aug. 29, 2008

(65) Prior Publication Data

US 2009/0061103 A1    Mar. 5, 2009

(30) Foreign Application Priority Data

Aug. 30, 2007  (DE) .......................... 10 2007 041 255
Sep. 7, 2007   (DE) .......................... 10 2007 042 548

(51) Int. Cl.
  *C10M 105/12*    (2006.01)
  *C10M 111/02*    (2006.01)
  *C09D 5/20*      (2006.01)

(52) U.S. Cl. ....... 508/583; 106/2; 106/285; 106/287.26; 252/364

(58) Field of Classification Search .................... 508/583
See application file for complete search history.

(56) References Cited

U.S. PATENT DOCUMENTS

| | | | | |
|---|---|---|---|---|
| 3,424,849 A | * | 1/1969 | Conklin et al. | 514/785 |
| 4,155,770 A | | 5/1979 | Doumani | |
| 4,781,757 A | * | 11/1988 | Lamb | 106/11 |
| 5,801,131 A | * | 9/1998 | Coffey et al. | 508/491 |
| 5,990,057 A | * | 11/1999 | Sharp | 508/583 |
| 6,063,177 A | * | 5/2000 | Meda et al. | 106/38.25 |
| 7,214,307 B2 | * | 5/2007 | Miller et al. | 208/14 |
| 7,951,231 B2 | * | 5/2011 | Riepe et al. | 106/2 |
| 2004/0234667 A1 | * | 11/2004 | Jennings | 426/601 |
| 2005/0258074 A1 | * | 11/2005 | Germaine | 208/99 |
| 2006/0016724 A1 | * | 1/2006 | Miller et al. | 208/24 |
| 2009/0036546 A1 | * | 2/2009 | Shah et al. | 514/762 |
| 2010/0024684 A1 | * | 2/2010 | Riepe et al. | 106/285 |

FOREIGN PATENT DOCUMENTS

DE    203 14 849 U1    12/2003
DE    202006003378    4/2006

OTHER PUBLICATIONS

Anonymous: "Dynamic, Absolute and KinematicViscosity", in: The Engineering Toolbox, [online] 2005, pp. 1-6, XP002530315.
Anonymous: "Klearol white mineral Oil", proct Data Sheet Sonneborn, [online], Dec. 19, 2005, p. 1, XP002530636.

* cited by examiner

*Primary Examiner* — Ellen McAvoy
(74) *Attorney, Agent, or Firm* — Henry M. Feiereisen; Ursula B. Day

(57) ABSTRACT

A liquid release agent for application onto an edge region of a panel, in particular a furniture panel, provided or to be provided with a coating by means of adhesive or glue, includes a mineral oil having a viscosity in compliance with German Industrial Standard DIN 51262 of $\geq 2.5$ to $\leq 35$ mm$^2$/s at a temperature of 20° C., and an alcoholic solvent which is added to the mineral oil.

9 Claims, No Drawings

LIQUID RELEASE AGENT

CROSS-REFERENCES TO RELATED APPLICATIONS

This application claims the priorities of German Patent Applications, Serial No. 10 2007 041 255.1, filed Aug. 30, 2007, and 10 2007 042 548.3, filed Sep. 7, 2007, pursuant to 35 U.S.C. 119(a)-(d), the contents of which are incorporated herein by reference in their entirety as if fully set forth herein.

BACKGROUND OF THE INVENTION

The present invention relates to a liquid release agent for application onto an edge region of a panel, in particular a furniture panel, provided or to be provided with a coating by means of adhesive or glue.

Nothing in the following discussion of the state of the art is to be construed as an admission of prior art.

Release agents may find application to prevent adhesive or glue remnants to stick to a furniture panel, when the edge of the furniture panel is coated with an edge strip. German utility model DE 203 14 849 U1 describes a release agent which includes a specialty gasoline as solvent with a low flash point and low viscosity number in white oil as carrier fluid. The use of specialty gasoline as solvent has shortcomings because it requires particular measures to protect the workplace environment, e.g. the specialty gasoline must be sucked off.

According to the Euro Material Safety Data Sheet, which is a form containing data regarding properties of a particular substance, liquid release agents containing specialty gasoline can cause skin irritation, adversely affects water due to its toxicity to water-borne organisms, can cause health hazards, in particular cause damage to the lungs, when ingesting the release agent, or may cause drowsiness and dizziness, when breathing in gasoline vapor. In addition, specialty gasoline has also an impact on various parts of the processing machine in which the release agent is used via spray devices. Deformations of transport belts has been experienced as a result of the use of specialty gasoline, causing a thickening of track shoes so that the operation is interfered with and the quality of the panel is impaired.

It would therefore be desirable and advantageous to provide an improved release agent to obviate prior art shortcomings and to allow its use for a wide variety of applications.

SUMMARY OF THE INVENTION

According to one aspect of the present invention, a liquid release agent for application onto an edge region of a panel, in particular a furniture panel, provided or to be provided with a coating by means of adhesive or glue, includes a mineral oil having a viscosity in compliance with German Industrial Standard DIN 51262 of $\geq 2.5$ to $\leq 35$ mm$^2$/s at a temperature of 20° C., and an alcoholic solvent added to the mineral oil.

The acronym DIN is the German national organization for standardization and stands for "German Institute for Standardization". DIN 51562 relates to Viscometry; determination of kinematic viscosity using the Ubbelohde microviscometer. It has now been found that the use of a mineral oil with low viscosity of $\geq 2.5$ to $\leq 35$ mm$^2$/s at a temperature of 20° C. according to DIN 51562 eliminates the need for use of gasoline or specialty gasoline.

According to another feature of the present invention, the viscosity of the mineral oil may be $\geq 3$ to $\leq 18$ mm$^2$/s.

According to another feature of the present invention, the viscosity of the mineral oil may be $\geq 2.5$ to $\leq 11$ mm$^2$/s.

According to another feature of the present invention, the viscosity of the mineral oil may be $\geq 5$ to $\leq 7$ mm$^2$/s.

According to another feature of the present invention, the viscosity of the mineral oil may be about 6.3 mm$^2$/s.

While conventional mineral oil with respectively higher viscosity required the addition of specialty gasoline to dissolve added alcohol, the alcoholic solvent can now be completely dissolved in the mineral oil to produce a solution of mineral oil and alcoholic solvent.

According to another feature of the present invention, the alcoholic solvent may be ethanol. Suitably, the ethanol may be present at a concentration of 85% to 99% by volume, whereas the mineral oil of low viscosity is contained as carrier at a concentration of 15% to 1% by volume.

The absence of specialty gasoline leads to less concentration of hydrocarbons in the breathable air, causing significantly better workplace conditions, with much less degreasing or irritating effect on the skin of the personnel. The release agent according to the invention has no longer any ingredients that pose a hazard to the environment, resulting in a simpler process and simpler machinery because the use of a suction device is no longer required. The adverse effects as outlined by the Euro Safety Data Sheet are no longer encountered.

Moreover, the use of the release agent according to the invention enhances the service life of the machinery used for production of the panel because of the absence of any adverse effects, such as deformation of transport belts, when contacting the release agent.

According to another feature of the present invention, a method includes the steps of adding a mineral oil having a viscosity in compliance with German Industrial Standard DIN 51262 of $\geq 2.5$ to $\leq 35$ mm$^2$/s at a temperature of 20° C. to an alcoholic solvent to provide a release agent, and applying the release agent onto an edge region of a panel which is provided or to be provided with a coating by means of adhesive or glue.

BRIEF DESCRIPTION OF THE DRAWING

None

DETAILED DESCRIPTION OF PREFERRED EMBODIMENTS

None

While the invention has been described in connection with currently preferred embodiments, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A liquid release agent for application onto an edge region of a panel provided or to be provided with a coating by means of adhesive or glue, comprising:
   a mineral oil having a viscosity in compliance with German Industrial Standard DIN 51262 of >2.5 to <35 mm$^2$/s at a temperature of 20° C.; and
   an alcoholic solvent added to the mineral oil, said alcoholic solvent having a composition free of specialty gasoline, wherein the alcoholic solvent is contained at a concentration of 85% to 99% by volume, whereas the mineral oil is contained as carrier at a concentration of 15% to 1% by volume.

2. The liquid release agent of claim 1, wherein the viscosity of the mineral oil is >3 to <18 mm$^2$/s.

3. The liquid release agent of claim 1, wherein the viscosity of the mineral oil is >2.5 to <11 mm$^2$/s.

4. The liquid release agent of claim 1, wherein the viscosity of the mineral oil is >5 to <7 mm$^2$/s.

5. The liquid release agent of claim 1, wherein the viscosity of the mineral oil is about 6.3 mm$^2$/s.

6. The liquid release agent of claim 1, wherein the alcoholic solvent is ethanol.

7. The liquid release agent of claim 1, wherein the mineral oil is white oil.

8. A method, comprising the steps of:
adding a mineral oil having a viscosity in compliance with German Industrial Standard DIN 51262 of >2.5 to <35 mm$^2$/s at a temperature of 20° C. to an alcoholic solvent to provide a release agent, wherein the alcoholic solvent has a composition free of specialty gasoline and is contained at a concentration of 85% to 99% by volume, whereas the mineral oil is contained as carrier at a concentration of 15% to 1% by volume; and
applying the release agent onto an edge region of a panel which is provided or to be provided with a coating by means of adhesive or glue.

9. The method of claim 8, wherein the panel is a furniture panel.

* * * * *